(12) United States Patent
Kahn et al.

(10) Patent No.: US 8,359,288 B1
(45) Date of Patent: Jan. 22, 2013

(54) METHOD AND APPARATUS TO UTILIZE SENSOR, MONITOR, DEVICE (SMD) DATA BASED ON LOCATION

(75) Inventors: Philippe Kahn, Aptos, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 260 days.

(21) Appl. No.: 11/323,058

(22) Filed: Dec. 30, 2005

(51) Int. Cl.
*G06F 7/00* (2006.01)
(52) U.S. Cl. ......... 707/602; 707/600; 707/800; 707/899
(58) Field of Classification Search .............. 707/3, 5, 707/110, 202, 204, 600, 602, 800, 899
See application file for complete search history.

(56) References Cited

U.S. PATENT DOCUMENTS

| | | | | |
|---|---|---|---|---|
| 5,539,312 A * | 7/1996 | Fu et al. | | 324/309 |
| 5,974,111 A * | 10/1999 | Krug et al. | | 378/57 |
| 6,076,048 A * | 6/2000 | Gunther et al. | | 702/51 |
| 6,199,008 B1 * | 3/2001 | Aratow et al. | | 701/120 |
| 6,317,684 B1 * | 11/2001 | Roeseler et al. | | 701/202 |
| 6,462,675 B1 * | 10/2002 | Humphrey et al. | | 340/905 |
| 6,490,519 B1 * | 12/2002 | Lapidot et al. | | 701/117 |
| 6,526,349 B2 * | 2/2003 | Bullock et al. | | 701/209 |
| 6,611,726 B1 * | 8/2003 | Crosswhite | | 700/99 |
| 6,711,404 B1 * | 3/2004 | Arpee et al. | | 455/423 |
| 7,155,507 B2 * | 12/2006 | Hirano et al. | | 709/224 |
| 2003/0208113 A1 | 11/2003 | Mault et al. | | |
| 2003/0236625 A1 | 12/2003 | Brown et al. | | |
| 2004/0017300 A1 | 1/2004 | Kotzin et al. | | |
| 2004/0024846 A1 | 2/2004 | Randall et al. | | |
| 2004/0043760 A1 | 3/2004 | Rosenfeld et al. | | |
| 2004/0044493 A1 | 3/2004 | Coulthard | | |
| 2004/0078219 A1 | 4/2004 | Kaylor et al. | | |
| 2004/0078220 A1 | 4/2004 | Jackson | | |
| 2004/0103139 A1 * | 5/2004 | Hubbard et al. | | 709/201 |
| 2004/0122294 A1 | 6/2004 | Hatlestad et al. | | |
| 2004/0122295 A1 | 6/2004 | Hatlestad et al. | | |
| 2004/0122296 A1 | 6/2004 | Hatlestad et al. | | |
| 2004/0122297 A1 | 6/2004 | Stahmann et al. | | |
| 2004/0122484 A1 | 6/2004 | Hatlestad et al. | | |
| 2004/0122485 A1 | 6/2004 | Stahmann et al. | | |
| 2004/0122486 A1 | 6/2004 | Stahmann et al. | | |
| 2004/0122487 A1 | 6/2004 | Hatlestad et al. | | |
| 2004/0146048 A1 | 7/2004 | Cotte | | |
| 2004/0148340 A1 | 7/2004 | Cotte | | |
| 2004/0148341 A1 | 7/2004 | Cotte | | |
| 2004/0148342 A1 | 7/2004 | Cotte | | |
| 2004/0148351 A1 | 7/2004 | Cotte | | |
| 2004/0148392 A1 | 7/2004 | Cotte | | |
| 2005/0101841 A9 | 5/2005 | Kaylor et al. | | |
| 2005/0107944 A1 * | 5/2005 | Hovestadt et al. | | 701/200 |
| 2005/0113650 A1 | 5/2005 | Pacione et al. | | |
| 2005/0182824 A1 | 8/2005 | Cotte | | |
| 2005/0240613 A1 * | 10/2005 | Logan | | 707/102 |

* cited by examiner

*Primary Examiner* — Etienne Leroux
*Assistant Examiner* — Bruce A Witzenburg
(74) *Attorney, Agent, or Firm* — Blakely, Sokoloff, Taylor & Zafman LLP; Judith A. Szepesi

(57) ABSTRACT

A method of using location-dependent sensor information comprising receiving information from one or more sensor/monitor/device (SMD) and determining a location associated with the SMD. The method further comprising integrating the SMD data into a comprehensive location-based database, and enabling a user to search for local conditions in the location-based database.

29 Claims, 15 Drawing Sheets

METHOD AND APPARATUS TO UTILIZE SENSOR, MONITOR, DEVICE (SMD) DATA BASED ON LOCATION

FIELD OF THE INVENTION

The present invention relates to sensor, monitor, device (SMD) data, and more particularly to using location-dependent SMD data.

BACKGROUND

Sensors, monitors and devices (SMDs) are proliferating. SMDs range from devices that monitor air quality, water quality, pollution levels, to devices that detect biological contamination, traffic levels, or other location-dependent factors of life. These SMDs can range from DUST sensors to larger installations which may monitor or detect multiple types of information.

However, such sensor information, while useful, is not easily accessible. For example, various universities are deploying DUST sensors to detect levels of air pollution. However, their sensors are only accessible through cumbersome interfaces. Additional data, such as pollen-level data available from the Weather Channel and similar sources is also available, but difficult to access, and even more difficult to integrate to provide a real view of the overall conditions in a particular location.

SUMMARY OF THE INVENTION

A method of using location-dependent sensor information comprising receiving information from one or more sensor/monitor/device (SMD) and determining a location associated with the SMD. The method further comprising integrating the SMD data into a comprehensive location-based database, and enabling a user to search for local conditions in the location-based database.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described uses data from multiple sensors/monitors/devices (collectively SMDs), integrates the data, and uses this data to provide location-specific/dependent information to users. This location data may be used to trigger automatic alerts. For example, if a user indicates that he or she is traveling in a particular region, the system may monitor the user's sensitivities, and in conjunction with pseudo-real-time data from the SMDs, may generate alerts for the user. For example, for a user who is sensitive to pollen, if the integrative data indicates that pollen levels are high, or will be high shortly, in the region, the user may be sent a message. In one embodiment, the message may be sent via SMS or MMS to the user's cellular telephone. Alternative message routes may be used.

The integrated SMD data may further be used to create maps upon user request, or paths avoiding particular locations which may have an adverse impact on a user. Simply put, the system integrates data from at least two sources, and provides location-based information from that data. These sources may be SMDs distributed at various sites, may be data available from news sources or other networked sources such as the California Highway Patrol (CHP), or other sensors which are capable of interacting with the server system of the present invention. In one embodiment, sensors may include DUST sensors (smart micro-sensors). In one embodiment, the sensors may include sensors carried by users on their cellular telephones.

Figure 1:
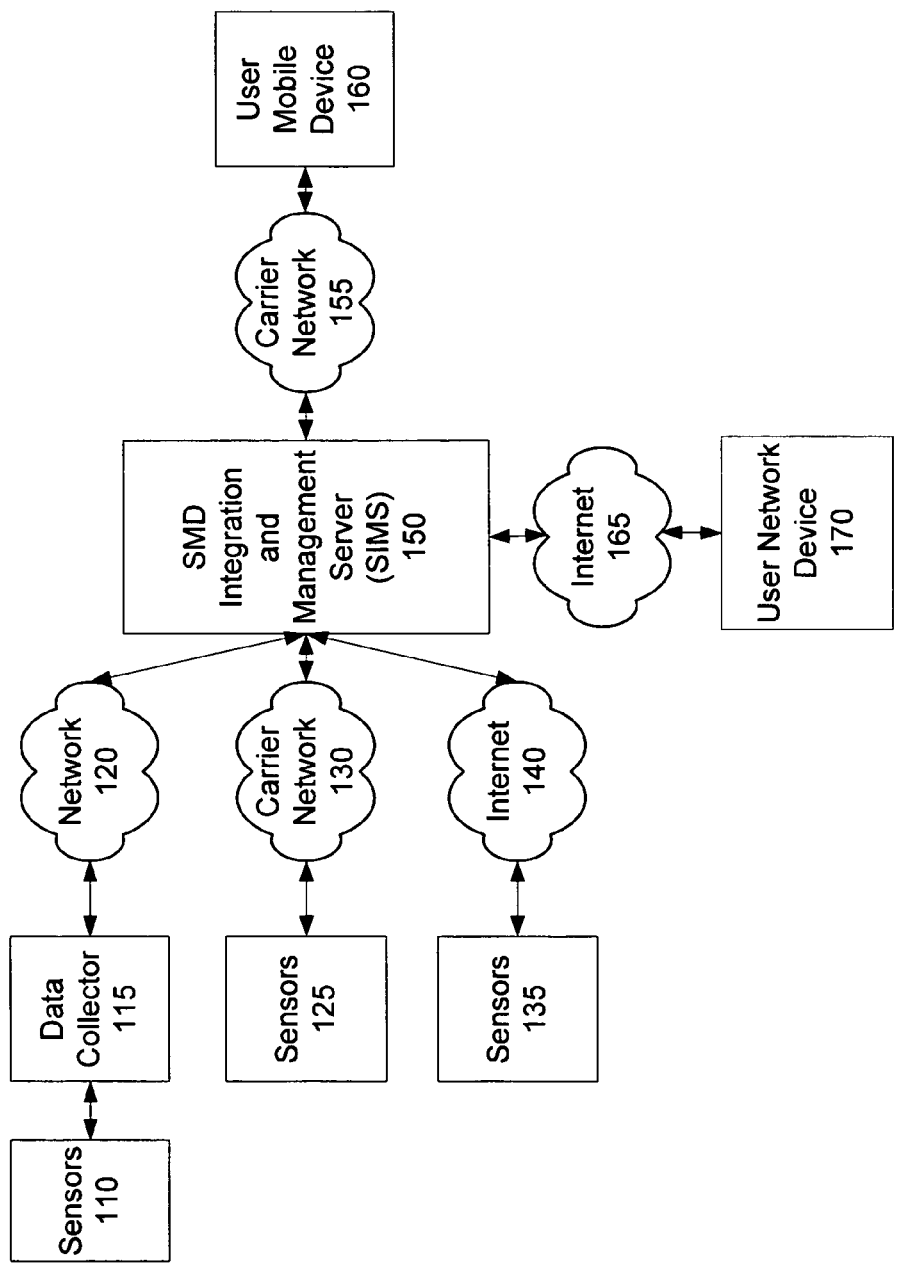
FIG. 1 is a network diagram of one embodiment of an overall Monitor Access Control Share (MACS) system.

FIG. 1 is a network diagram of one embodiment of the various elements of the system. The various SMDs 110 are coupled through various means to the SMD Integration and Management Server (SIMS) 150. They may be coupled directly, as shown for SMD 125, coupled through carrier network 130, or SMD 135 coupled through the Internet 140, or they may be coupled through a data collector 115, which accumulates data from sensor 110, and sends it through network 120 to SIMS 150.

SIMS 150 contains the manage/access/control/share MACS system (not shown). The MACS system is then accessible via the Internet 165, carrier network 155, or some other means to various user devices 160, 170. In one embodiment, the SMDs 135 transmit their location as part of the data sent to the SIMS 150.

Figure 2A:
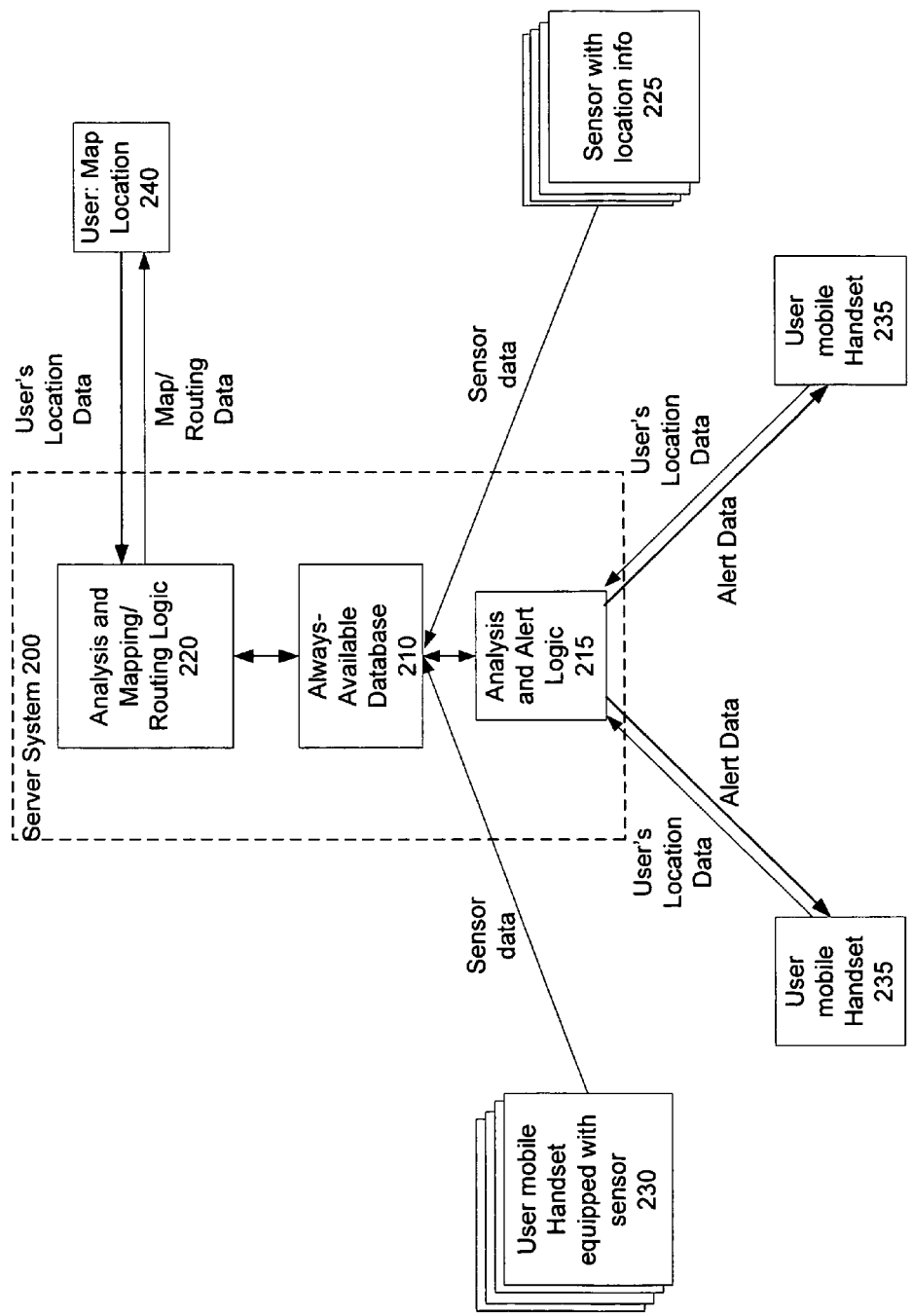
FIG. 2A is an overview diagram of one embodiment of a server system including connections to various outside devices.

FIG. 2A is an overview diagram of one embodiment of a server system including connections to various outside devices. Server system 200 may reside on one or more servers. Server system includes one or more always-available databases 210 based on SMD data. As will be described below, the data in database 210 is based on sensors 225, 230, which provide sensor data, and interpretation of the data, by server system 200.

Analysis and alert logic 215 receives user location data from various user handsets 230, 235. The analysis and alert logic 215 uses the data in database 210 to determine whether any alerts should be sent to the user. For example, a user may have a pre-registered allergy to pollen. Therefore, if a sensor is showing an elevated level of pollen in the vicinity where the user is heading, the analysis and alert logic 215 may send an alert to the user's mobile handset 230, 235, indicating the potential problem condition.

An alternative way of interacting with the server system 200 is through mapping software. The user may connect to the server from a location that enables the display of maps, 240. This may include a user handset configured to display such data, desktop or laptop computers, or other display mechanisms such as kiosks.

After the user's location, or location and path data is received, the analysis and mapping/routing logic 220 generates a map of the user's vicinity. If appropriate, the analysis and mapping/routing logic 220 also generates a route between the user's current location and desired destination. In one embodiment, the system does not internally generate the route, but rather relies on available mapping software such as Yahoo Maps. In one embodiment, the underlying map is from an existing system, but the routing logic identifies areas which are, according to the data in the database 210, to be avoided, and routes around those areas. In one embodiment, the system indicates to a standard mapping software that certain areas, those flagged by database 210, are not accessible, thereby forcing the mapping software to route around those areas. The map/routing data may be passed to the user 240.

Figure 2B:
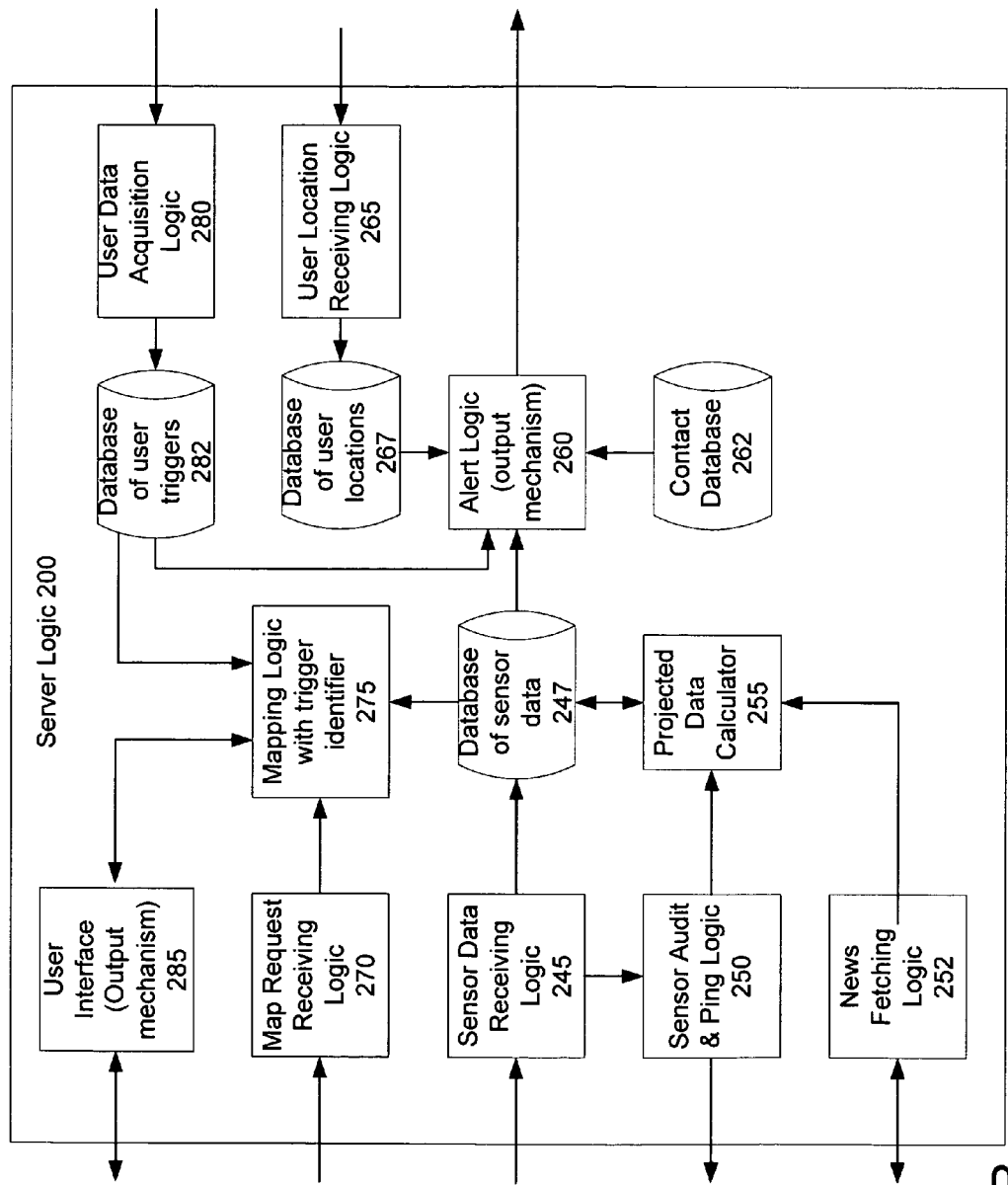
FIG. 2B is a block diagram of one embodiment of the server.

FIG. 2B is a block diagram of one embodiment of the server. The sensor data receiving logic 245 continuously receives sensor data from one or more sensors. In one embodiment, there are many sensors which periodically send data to server logic 200.

The data is stored in the database of sensor data 247. In one embodiment, the sensor audit/ping logic 250 monitors the incoming sensor data stream. In one embodiment, if no data is received within the expected period of the sensor—i.e. one or more data sets are missing—the sensor audit/ping logic 250 sends a ping to the sensor (if it is capable of receiving pings). This ping is a request for data, in one embodiment. In one embodiment, if the sensor audit/ping logic 250 may include the ability to send an alert to a technician if no data is received from a sensor or set of sensors in response to a ping, or within a period of time.

In one embodiment, if no data is received from sensor(s), the projected data calculator 255 generates "projected" data from the sensors. In one embodiment, projected data calculator may use one or more of the following information sources to generate the "projected data": news data from news fetching logic 252, past data from the sensor and past and current data from nearby sensors from the database 247, and historical data. Other data sources may also be used. The data is then stored in the database 247.

Output mechanisms include an alert logic 260 and a user interface 285. Alert logic 260, in one embodiment, uses a database of user triggers an 282 and user locations 267 to determine whether any user's thresholds are being exceeded by currently reported data. For example, a user may have an allergy to ragweed, and if a certain concentration of ragweed is detected, alert logic 260 may alert the user. In one embodiment, the alert is sent out in the format(s) specified by a contact database 262.

In one embodiment, alert logic 260 uses the user's current location, received via user location receiving logic 265 from the user, to determine whether any alerts need to be sent. The user location may be received based on GPS data, based on cell phone tower data, based on user input, or based on any other available data.

In one embodiment, the user's allergies and other relevant information is obtained by user acquisition logic 280. In one embodiment, the user fills out a questionnaire. In another embodiment, the user's data may be obtained from medical reports, doctors' input, or other means. Of course, consent is received from the user prior to obtaining such data. Furthermore, the data is kept confidential in databases 282.

In one embodiment, the user may request a map or route via map request logic 270. Mapping logic 275 calculates or obtains a map, and overlays the sensor data, as relevant to the particular user(s) requesting the data. In one embodiment, the mapping logic 275 pulls this data from an available mapping service such as Yahoo Maps, Mapquest, Google Maps, etc. In one embodiment, mapping logic further overlays the trigger data from database 247, as appropriate for the user. In one embodiment, the mapping may utilize multiple users' triggers. The data is sent to the user via user interface 285. The data may be provided via a web browser or other such device, via a cell phone, or any other display device to which data may be sent. Note that while the term "user interface 285" is used, that logic is simply the logic that outputs data in response to user requests. It does not necessarily correspond to a traditional interface.

In one embodiment, the user may tighten or loosen the restrictions on the routing, through user interface 285. In one embodiment, there is a system default that routes around triggers of a particular level. The user may indicate that a "stricter routing" or "less strict routing" should be used instead. Stricter routing may increase the length of the trip, by avoiding additional trigger areas.

Figure 3:
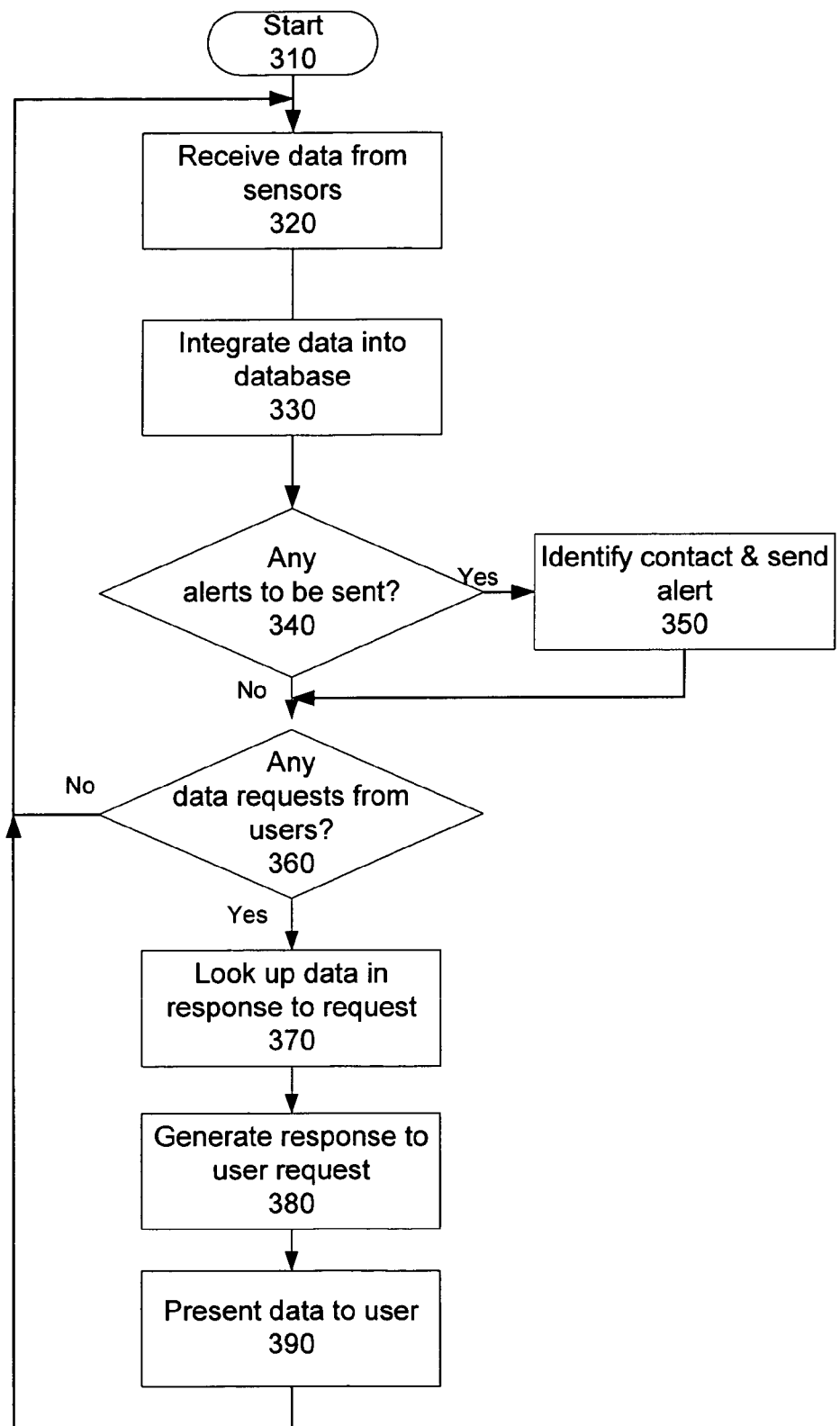
FIG. 3 is a flowchart of one embodiment of utilizing location-based SMD data.

FIG. 3 is a flowchart of one embodiment of utilizing location-based SMD data. The process starts at block 310. At block 320, the system receives data from one or more sensors. At block 330, the sensor data is integrated into the comprehensive location-based database. In one embodiment, this includes identifying the location of each sensor from which sensor data is received. In another embodiment, for Smart Dust sensors, only a general location range for a set of sensor data is identified.

At block 340, the process determines whether there are any alerts that should be sent. Alerts are sent when a user's thresholds are exceeded. This is explained in more detail below. If there are alerts, at block 350, the contact information for the alert is identified, and it is sent. The process then continues to block 360. If no alerts need to be sent, the process continues directly to block 360.

At block 360, the process determines whether any requests for data have been received from a user. If no requests have been received, the process returns to block 320, to continue receiving data. Otherwise, the process continues to block 370.

At block 370, the system looks up the data in the comprehensive location database. In one embodiment, the data may include data about a certain location or range of locations, mapping information about a location, routing information from one location to another, or other location-based information. At block 380, the data is processed, in response to the user request. The processing comprises generating data of relevant triggers, maps including triggers, routes avoiding triggers, and other location-specific processing based on the user's location. Note that the user's location may be determined based on real-time data, such as GPS, cellular tower, WiFi locator information, or any other real-time data acquisition mechanism. Alternatively, the user's location may be based on user input or past information (i.e. normal location at this time of day).

The data is presented to the user, at block 380. The data may be presented through an output mechanism which may include a web interface, a mobile device interface, a data sending interface which sends data in any available format including email, SMS, MMS, etc., or any other interface. The process then returns to block 320, to continue receiving data from the sensors. Note that while these, and other below, processes are described as flowcharts, they need not occur in a particular order.

Figure 4A:
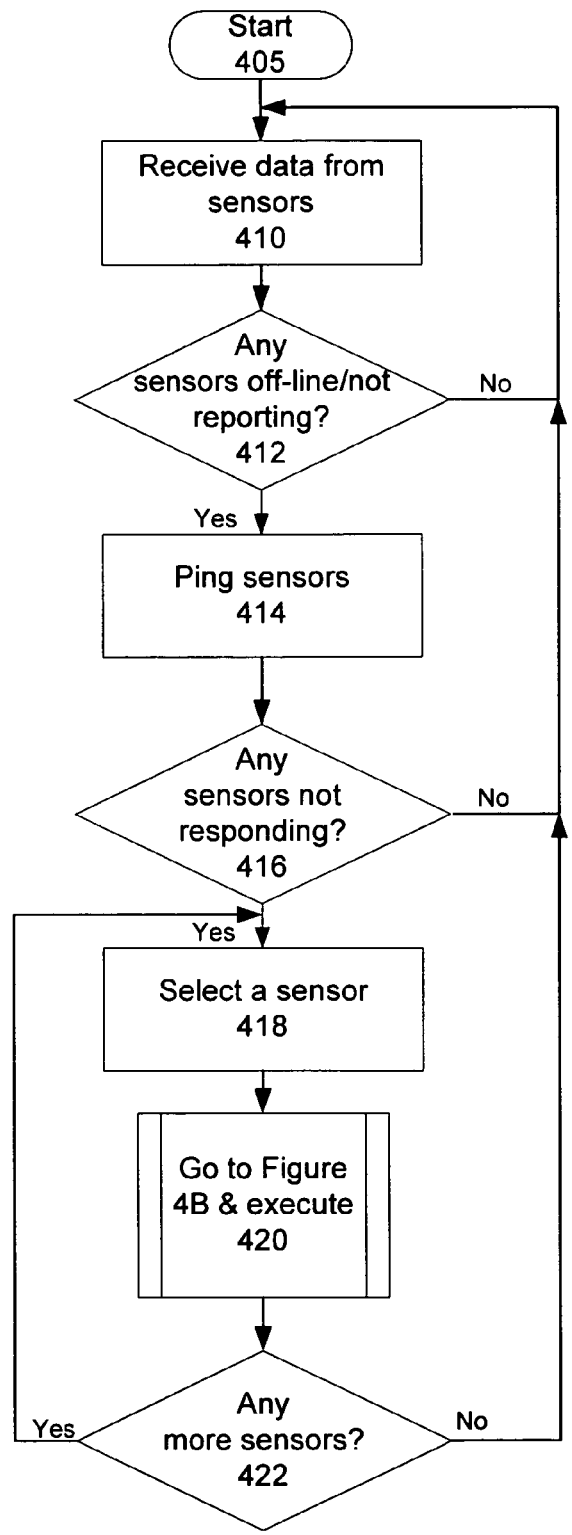
FIGS. 4A and 4B are a flowchart of one embodiment of integrating data from multiple sensors into the database.
Figure 4B:
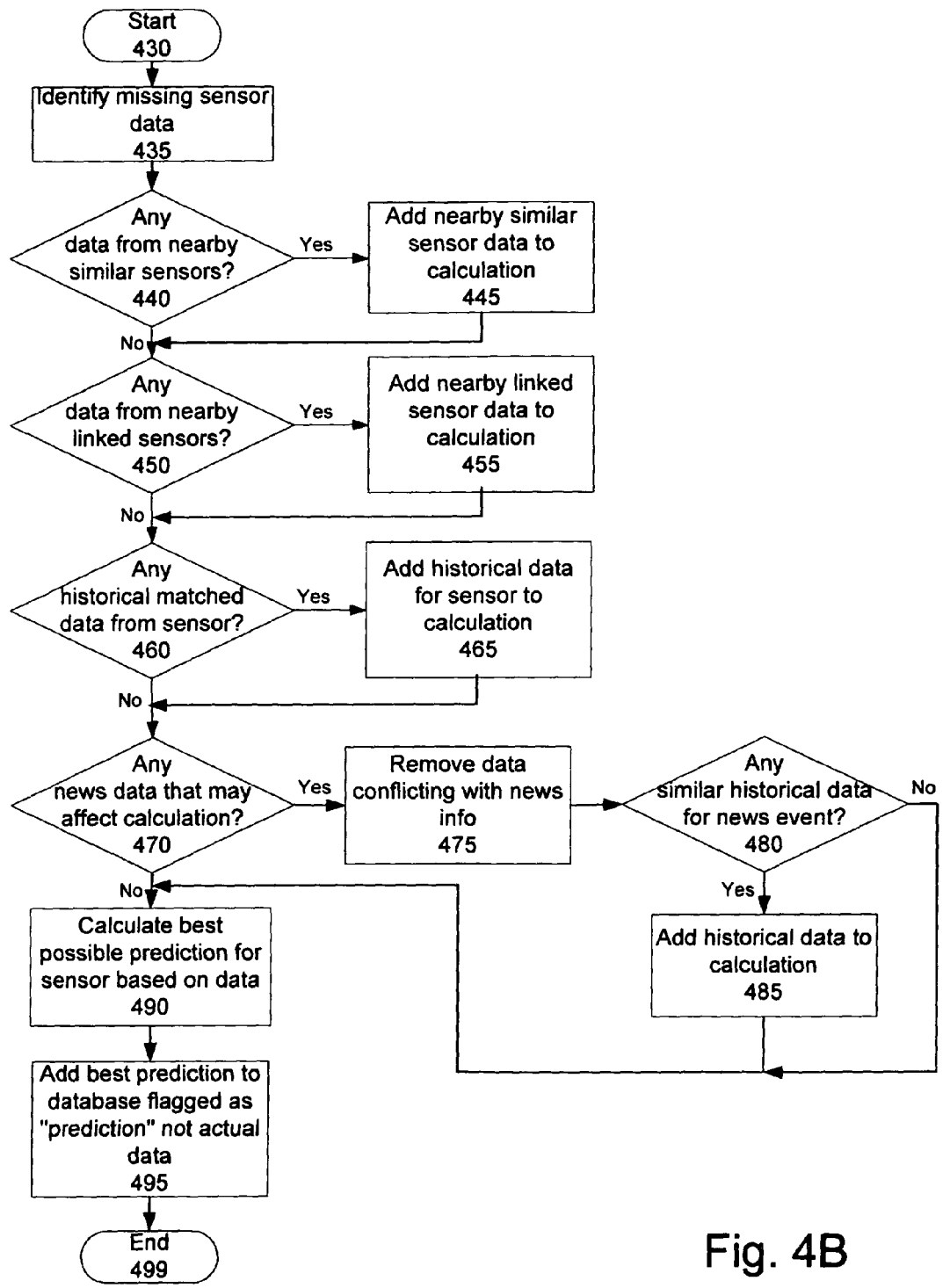

FIGS. 4A and 4B are a flowchart of one embodiment of integrating data from multiple sensors into the database. The process starts at block 405. At block 410, data is received from one or more sensors. In one embodiment, each sensor is instructed to send data at particular intervals. For example, an air quality sensor may send data every ten minutes. On the other hand, a water quality sensor may measure only once per day. Any other measuring interval may be defined, ranging from second or sub-second intervals to multi-day, month, or even year intervals. In one embodiment, a sensor may vary its reporting frequency based on various circumstances. For example, a traffic pollution level sensor may report more frequently during rush hour periods than the middle of the night.

At block 412, the process determines whether any sensors are not reporting/off-line. In one embodiment, the system determines if the sensor has missed two reports. If no sensors are off-line, the process returns to block 410, to continue receiving data and thereby monitor the system.

If there are any off-line sensors, at block 414 the system pings the sensors. In one embodiment, the ping is a request for data. In one embodiment, the ping is a command to power cycle the sensor. Other relevant commands may be sent as a ping. Note that in one embodiment the sensors may not be able to receive pings. In that case, the process continues directly to block 420, and executes the processes described with respect to FIG. 4B.

If the sensors can respond to pings, the process sends the ping at block 414, and determines at block 416, whether any of the sensors still did not send data in response to the ping. If all sensors are now on-line and sending data, the process returns to block 410 to continue monitoring. Otherwise, the process continues to block 418.

At block 418, a sensor, from among the non-responsive off-line sensors, is selected. At block 420, an interpolation process is performed to "project" the off-line sensor's data. This is described in more detail below with respect to FIG. 4B. The process then determines, at block 422, whether there are any remaining sensors. If so, the process returns to block 418 to select the next sensor. Otherwise, the process returns to block 410.

Note that although these figures are shown in flowchart form, the processes need not be performed in a particular order, unless necessary for the functioning of the system. For example, separate threads may be started for each sensor, and the ping and interpolation process may be performed in parallel.

FIG. 4B shows a flowchart of one embodiment of generating interpolated data in response to missing data. The missing data may be due to one or more off-line sensors. The process starts at block 430, when the interpolation process is invoked as described above. In one embodiment, this process is performed in response to not receiving an expected data from one or more sensors. In another embodiment, this process is performed only when data is requested by a user, and the system determines that one or more sensors' data is not available.

At block 435, the missing sensor data is identified. In one embodiment, the missing sensor data corresponds to one or more sensors which have not sent in their data at the expected time. Alternatively, the missing data may correspond to an area that is not sufficiently seeded with sensors. If the missing data is from one or more sensors which did not send in their information, the identification includes, in one embodiment, the sensor type and sensor location.

At block 440, the process determines whether there is data available from nearby similar sensors. In one embodiment, the sensor "fields" may overlap. Thus, nearby sensor data may be useful in interpolating the missing data. If there are nearby similar sensors, at block 445, their data is added to the calculation.

At block 450, the process determines whether there are nearby linked sensors. Linked sensors, in this context, means sensors whose values are related to the values of the missing sensors. For example, if a carbon monoxide sensor is missing, a sensor that indicates the traffic levels would be considered a linked sensor. If linked sensor data is available, at block 455, it is added to the calculation.

At block 460, the process determines whether there his historical data available from the missing sensor. In one embodiment, historical data includes data for a similar time recorded while the sensor was functioning. In one embodiment, historical data includes the most recently recorded sensor values. If such data is available, the process, at block 465, adds it to the calculation.

At block 470, the process determines whether there is news available that conflicts with any of the above data. In one embodiment, this involves retrieving news stories from the sensor's vicinity, and determining whether any of the news stories may distort the nearby, historical and/or linked sensor data. If there is such news, then at block 475, the data conflicting with the news is removed. At block 480, the system then determines if there a similar historical event, for which comparable data could be retrieved. If so, at block 485, the appropriate historical data is added to the calculation. The process then continues to block 490. If there is no conflicting news, the process continues directly to block 490.

At block 490, the best prediction is calculated for the missing sensor data, based on those of the elements included. In one embodiment, the best prediction starts with a basis of the most recent historical data of the same sensor, adjusts it based on nearby sensor data, linked sensor data, and historical data.

At block 495, the best prediction is added to the sensor database, flagged as "prediction." In one embodiment, such "prediction" data is not used as linked/similar sensor data for other predictions, and is only used in providing alerts, or mapping/routing data to a user. In one embodiment, any prediction-based alerts/maps/routes are appropriately labeled so the user is aware that it is predictive data.

Figure 5A:
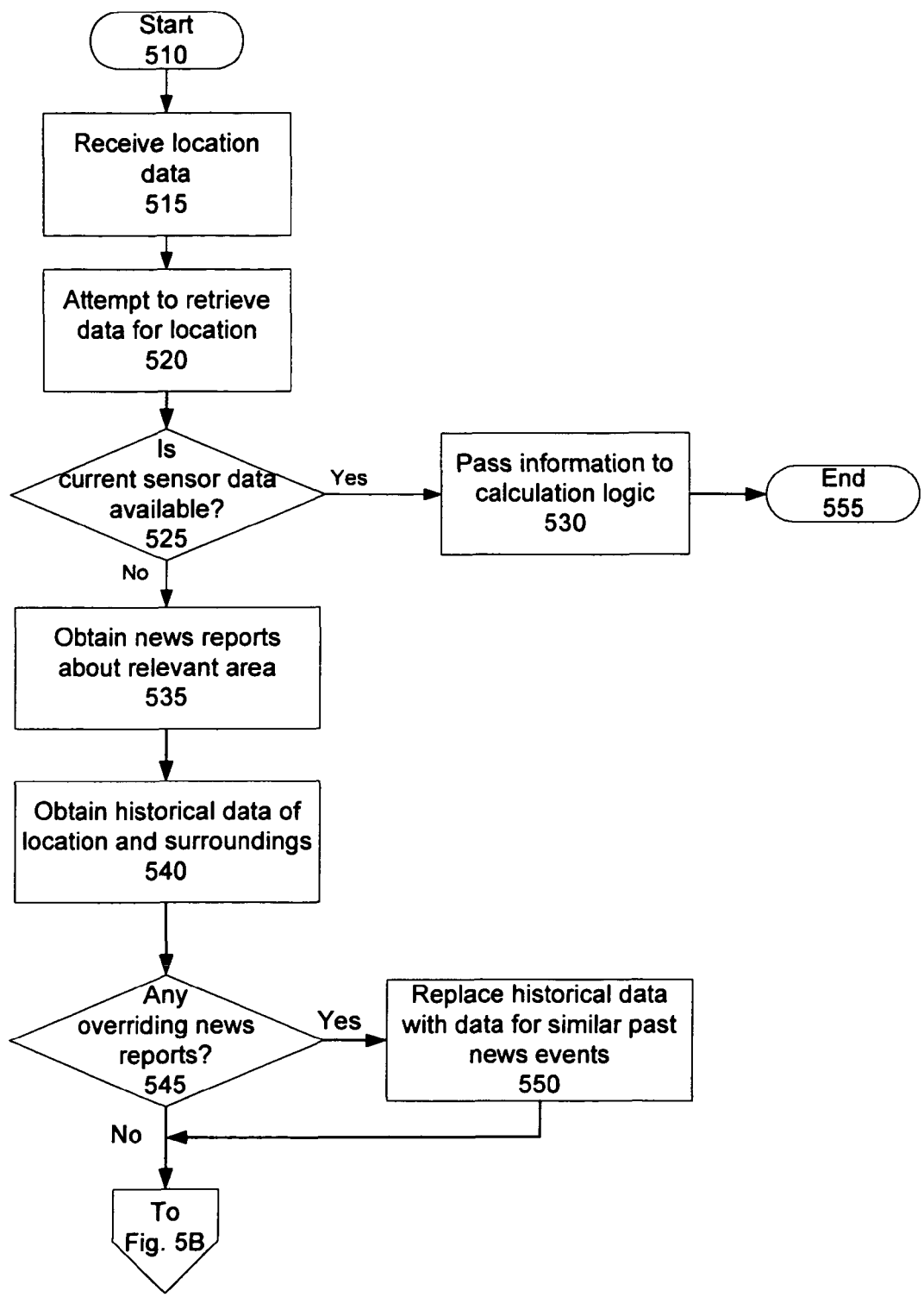
FIGS. 5A and 5B are a flowchart of one embodiment of retrieving data in response to a request.
Figure 5B:
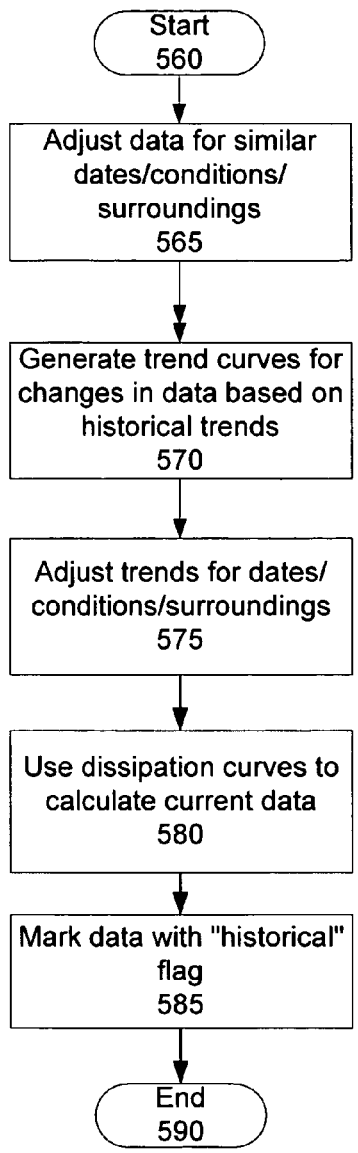

FIGS. 5A and 5B are a flowchart of one embodiment of retrieving data in response to a request. The process starts at block 510. In one embodiment, the process starts when a data request is initiated. This may be done automatically by the user's system, or manually by the user. In one embodiment, the data request may be data about a particular region, map data, or routing data.

At block 515, location information is received. This information, in one embodiment, is automatically generated by the user's system. In another embodiment, this information is automatically calculated based on data available from the user's system.

At block 520, the system attempts to retrieve data for the location. In one embodiment, the data is sensor data for sensors associated with the area. In one embodiment, these sensors may be single sensors, i.e. the water flow sensor at outlet X, or may be multiple sensors, i.e. some subset/all sensors within Y feet of location Z. At block 525, the process determines whether the current data is available. If so, the information is passed to the calculation logic, at block 530, and the process ends at block 555.

If the current sensor data is not available, the system continues to block 535.

At block 535, the system in one embodiment obtains news reports about the particular area. These news reports may include actual news (i.e. oil spill), statistical information (i.e. current traffic flow), or other information available from various electronic sources. In one embodiment, the system maintains a set of look-up links, to various sites that provide such information.

At block 540, the historical data of the location and its surroundings is retrieved. The historical data may include recent historical data (i.e. data from the same or similar sensors within a relatively short time period) as well as older historical data (for example data from the same sensor at an equivalent time in the past.) In one embodiment, the historical data is retrieved from the central data repository. In one embodiment, historical data includes data from one or more sensors in a particular area that is not sufficiently covered with currently active sensors.

At block 545, the process determines whether there are any news reports that may override the historical data. For example, in a situation where there is a traffic jam in an area, historical data about air pollution levels may be wrong. If there is such a news report, the process continues to block 550. At block 550, the historical data is replaced with data for similar past news events. In on embodiment, historical data is not replaced, but rather modified. For example, if it is statistically determined that a traffic jam adds a certain particulate count to the air in a certain period of time, this additional data may be added to the existing historical data.

Note that while the term "historical data" is used, this can mean many things. For example, historical data may include actual sensor data over time, trend lines, etc.

The process then continues to block 560. If there are no overriding news reports, the process continues directly to block 560.

At block 560, the historical data is adjusted for similar dates/conditions/surroundings. Generally speaking, many conditions and environmental situations are seasonal. For example "rag weed season" occurs at approximately the same time each year. If the historical data being used relies on data obtained during rag weed season, it would provide absolutely wrong information in December. Therefore, historical data is seasonally adjusted and evaluated.

At block 570, trend curves for changes in data are generated. This is especially useful for historical data that indicates a spike or significant increase. Using the proper dissipation and trend curves enables projection of how known conditions will have changed over time.

At block 575, the trend curves are further adjusted for dates, conditions, and surroundings. For example, a pollen release is dissipated much faster if the conditions are windy.

At block 580, the dissipation curves are used to calculate the current data based on the historical/news/adjusted data.

At block 585, this data is marked with the "projection" label, indicating that it is not accurate data but rather a projection generated by the system. In one embodiment, users do not receive alerts based on projected data. In one embodiment, whenever projected data is used, whether in mapping, routing, or alerting, the fact that the data is only projected data is clearly indicated. The process then ends at block 590.

Figure 6:
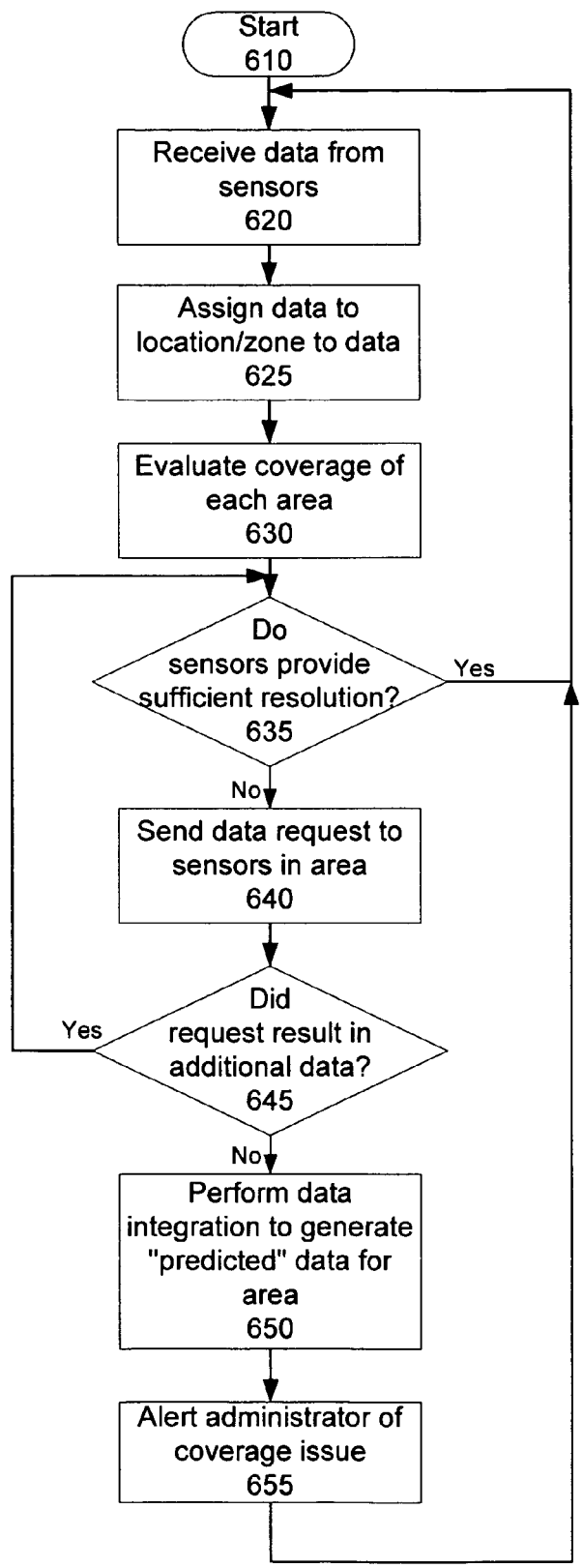
FIG. 6 is a flowchart of one embodiment of generating integrated data for areas not fully covered by sensors.

FIG. 6 is a flowchart of one embodiment of generating integrated data for areas not fully covered by sensors. The process starts at block 610. At block 620, data is received from sensors.

At block 625, location or zone data is assigned to the sensor data. In one embodiment, these sensors may have GPS or similar location determination methods. Alternatively, the sensor data may be collected by a directional system which determines the sensor location based on directionality and signal strength. Alternatively, the sensor may send via a particular address, communications band, modulation, or methodology, based on its location.

At block 630, the coverage of each area is evaluated. In one embodiment, this is done periodically, for example once per week. This may be a useful status check.

At block 635, the process determines whether the sensor data has sufficient resolution. The level of preferred or required resolution may vary by area, as well as sensor type. For example, for monitoring traffic an area with high traffic variation may need more sensors than an area with lower density and variation. In one embodiment, an administrator may set preferred resolution levels. If the coverage is good enough, the process returns to block 610, to continue receiving data and assigning location/zone information.

If the resolution is not sufficiently high, the process continues to block 640. At block 640, the process sends a data request to sensors in the area having too low coverage. At block 645, the process determines whether the request resulted in additional data. If so, the process returns to block 635, to evaluate whether with the additional data, the resolution is sufficient. Otherwise, the process continues to block 650.

At block 650, data integration is performed to generate projected/predicted data for the area. As discussed above, in one embodiment these projections are labeled.

At block 655, an administrator is alerted that the resolution on the data is insufficient. The administrator may resolve this by providing additional sensors, ensuring that all current sensors are fully functional, or changing the resolution rate requested. The process then returns to block 620, to continue receiving new data.

Figure 7A:
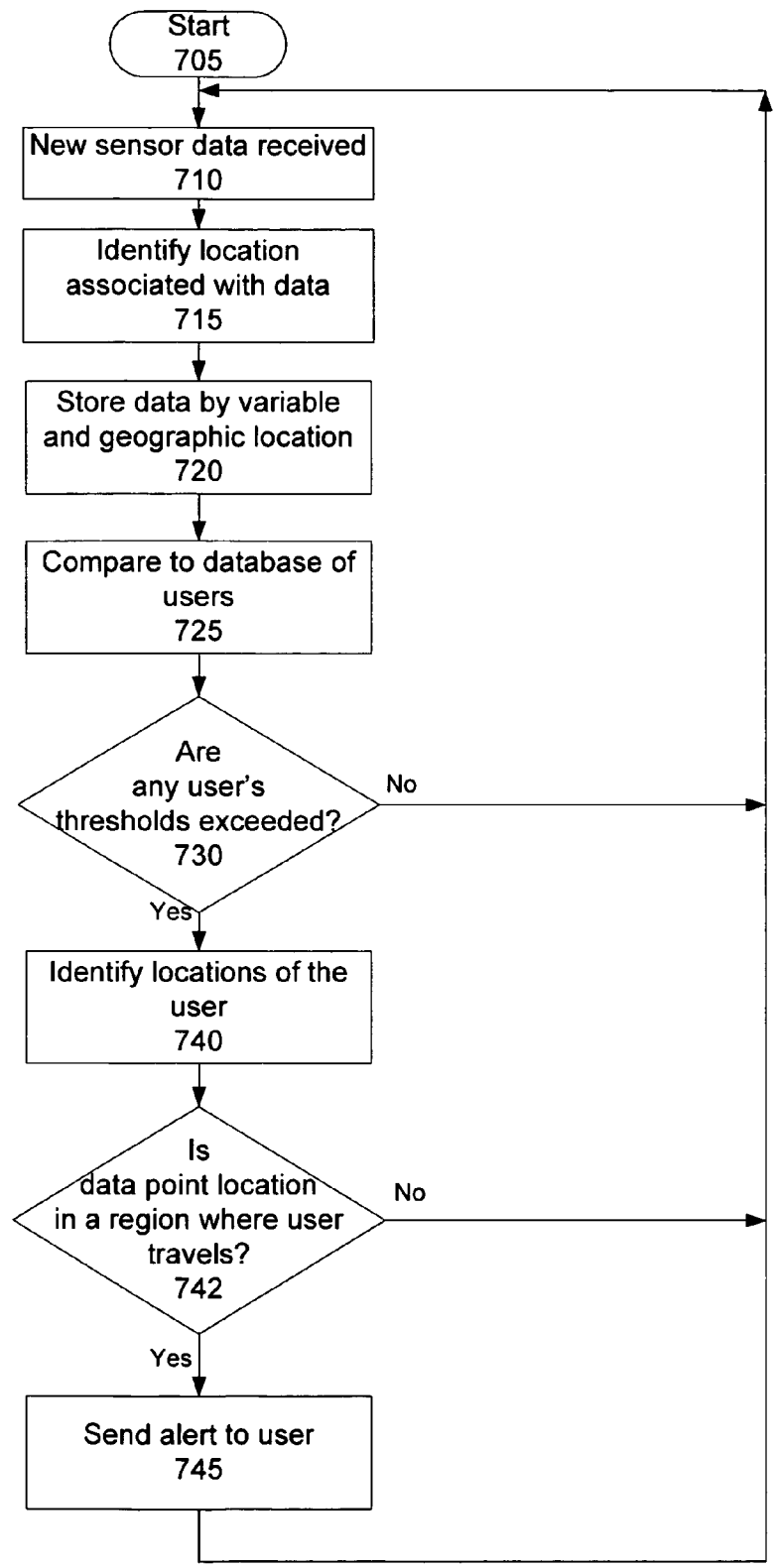
FIG. 7A is a flowchart of one embodiment of triggered alerts.

FIG. 7A is a flowchart of one embodiment of triggered alerts. In one embodiment, the system may collect data and use the data to send alerts to users. The process receives new sensor data at block 710. At block 715, a location is identified with the sensor data, and the data is then stored, at block 720. In one embodiment, the data is stored by variable and geographic location. Alternately, the data may be stored by location "zone" and then by variable.

At block 725, the data is compared to the database of users. Users may each have one or more locations associated with them. In one embodiment, this location may be the current location of the user. This location may be determined via the user's handheld device, such as a cellular telephone, GPS device, or other similar device. In one embodiment, these locations include all "tagged" locations which were indicated by the user to be of interest. In one embodiment, these locations are locations where the user has been in the past. Alternative location identification methods may be used.

At block 730, the process determines whether any user's thresholds are exceeded based on the data. In one embodiment, these thresholds may be single values (i.e. ragweed content over X parts per million (PPM). In one embodiment, thresholds may include trends (i.e. increase of % percent in overall particulates in the air over a period). If no user thresholds are exceeded, the process returns to block 710, to continue to receive data. Otherwise, the process continues to block 740. At block 740, the user locations are identified & the data points are mapped to user locations. If the location is not one where the user travels, the process returns to block 710. Otherwise, the process continues to block 745.

Note that while this is illustrated as two different steps, in practice, in one embodiment, it would be combined into a single step evaluating whether any point is above the threshold level of a user who is in that location.

At block 745, an alert is sent to the user. In one embodiment, when the user initially registers, he or she indicates the form, or forms, for alerts. Formats for alerts can include email, voicemail, SMS, MMS, audible alerts, etc. The process then returns to block 710.

Figure 7B:
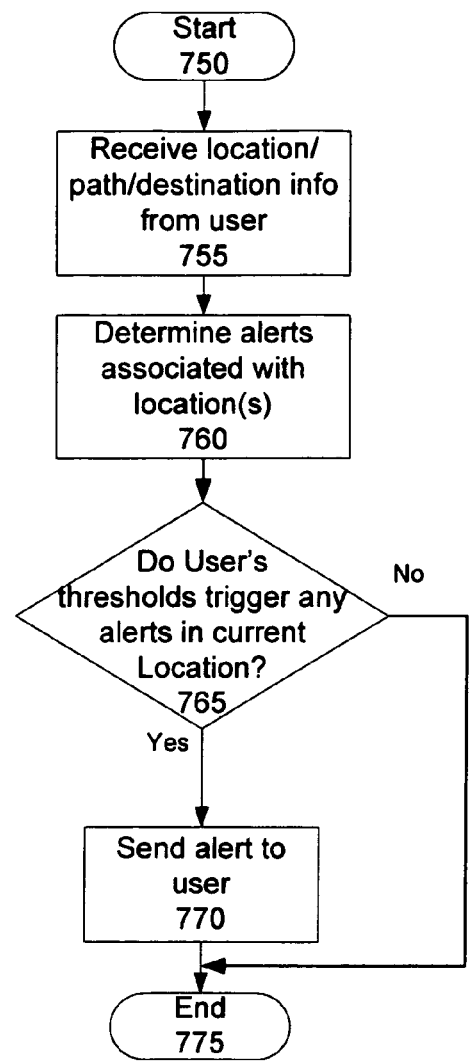
FIG. 7B is a flowchart of one embodiment of user-location based alerts.

FIG. 7B is a flowchart of one embodiment of user-location based alerts. In this instance, the user initiates the process. The process starts at block 750. At block 755, the location, path, or destination information is received from the user.

At block 760, the alerts associated with the location(s) identified by the user are determined. In one embodiment, the user's identity is included in the original request. The user's identity is used to look up the user's preset thresholds and preferences. These thresholds and preferences are then compared to the actual data received from the sensor(s).

At block 765, the process determines whether any of the user's thresholds were exceeded. As noted above these thresholds may be fixed values, or may be trends. If no threshold is exceeded, the process ends. Otherwise, at block 770, an alert is sent to the user. In one embodiment, the device on which the user entered the original request is used by preference for this alert. This device may be a portable device such as a PDA, cell phone, or any other network enabled device. The process then ends at block 775.

Figure 8A:
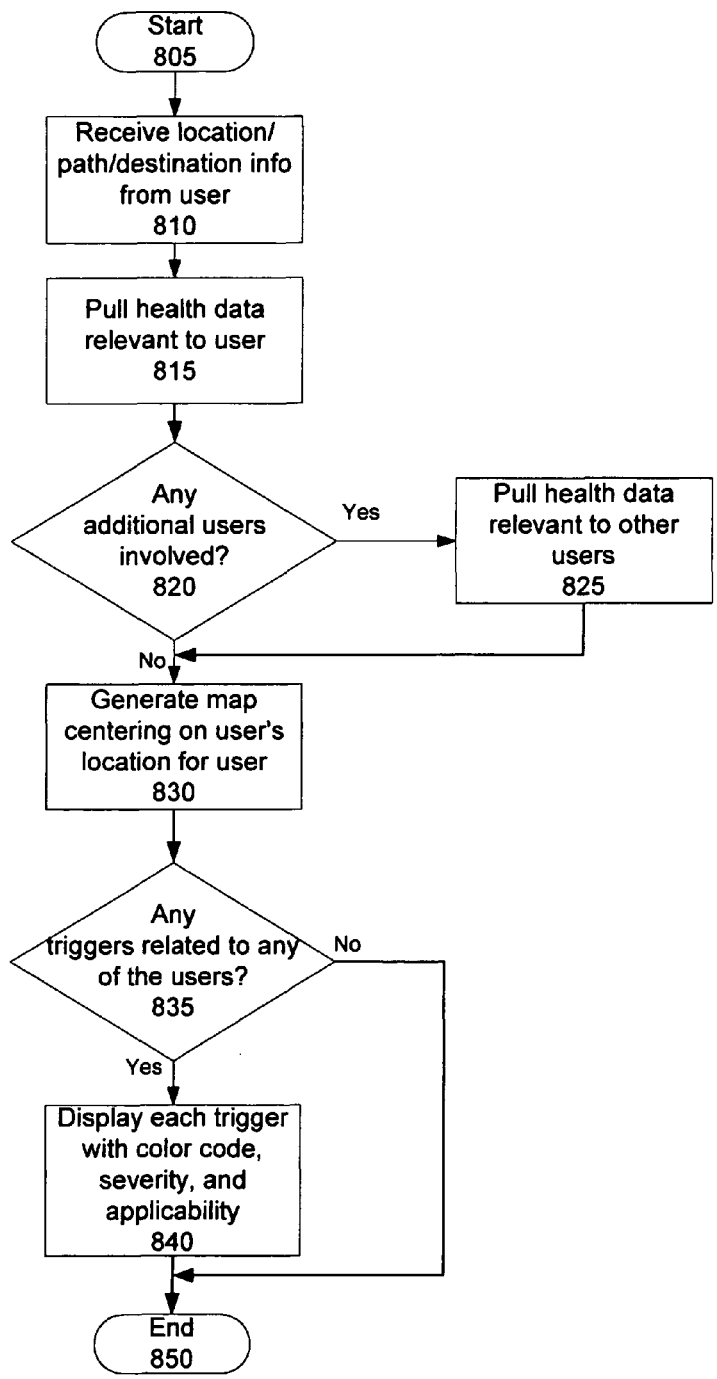
FIG. 8A is a flowchart of one embodiment of map generation using the SMD data.

FIG. 8A is a flowchart of one embodiment of map generation using the SMD data. The process starts at block 805. This process relies on the data that is stored in an MACS database. One embodiment of a MACS database is described in co-pending application U.S. Ser. No. 11/192,549 filed Jul. 29, 2005, and incorporated in its entirety herein by reference.

At block 810, the process receives location, path, or destination information from a user. In one embodiment, this data may be received via a web interface, at a website. In another embodiment, this data may be received via electronic mail, SMS, MMS, or other formats.

At block 815, the process pulls the information related to the user's preferences and settings. This information may include the user's chemical, biological, meteorological, and other sensitivities, and certain threshold levels which the user considers "triggers" for negative response. For example, a user with asthma may have high sensitivity to pollen of all sorts, pollution levels, etc. However, the user's sensitivity may be ameliorated by high wind conditions.

At block 820, the process determines whether there are any other users involved. In on embodiment, the request is received from a single user. However, that user can indicate that others are going to be traveling with the originating user. For example, the driver of a carpool may include each person in the carpool for the purposes of routing. In one embodiment, the user may manually enter the identities of these individuals. In one embodiment, once this information has been entered once, the system saves this information. In one embodiment, the user may subsequently select the fellow travelers with a single click. For example, there may be a single button which the user can label "the whole family" which would include all of the "usual suspects" in the family for that location/path/destination. Similar buttons may be created for other common groupings. This simplifies the user interface when the user is accessing the system from a limited capability device.

If there are other users, at block 825, the health data for the other users is also retrieved.

At block 830, a map is generated for the user's location/destination. In one embodiment, the map generation may be done by an available third party engine such as MapQuest, Google Maps, or another service.

At block 835, the process determines whether there are any triggers related to any of the users. If so, triggers are, in one embodiment, displayed on the map. In one embodiment, triggers are color coded. In one embodiment, each trigger indication includes a location (shown on the map), tier (severity), applicability (affected users), and additional information.

In one embodiment, this data may actually be presented in text form, for example adjacent to the map. For example, trigger 910 may be described as "the area centering on Lawrence Expressway and Reed/Monroe for 0.25 mi."

The process then ends, at block 850. In one embodiment, the user may make adjustments in this map, by adding or removing users, altering trigger level displays, and selecting a new location.

Figure 9:
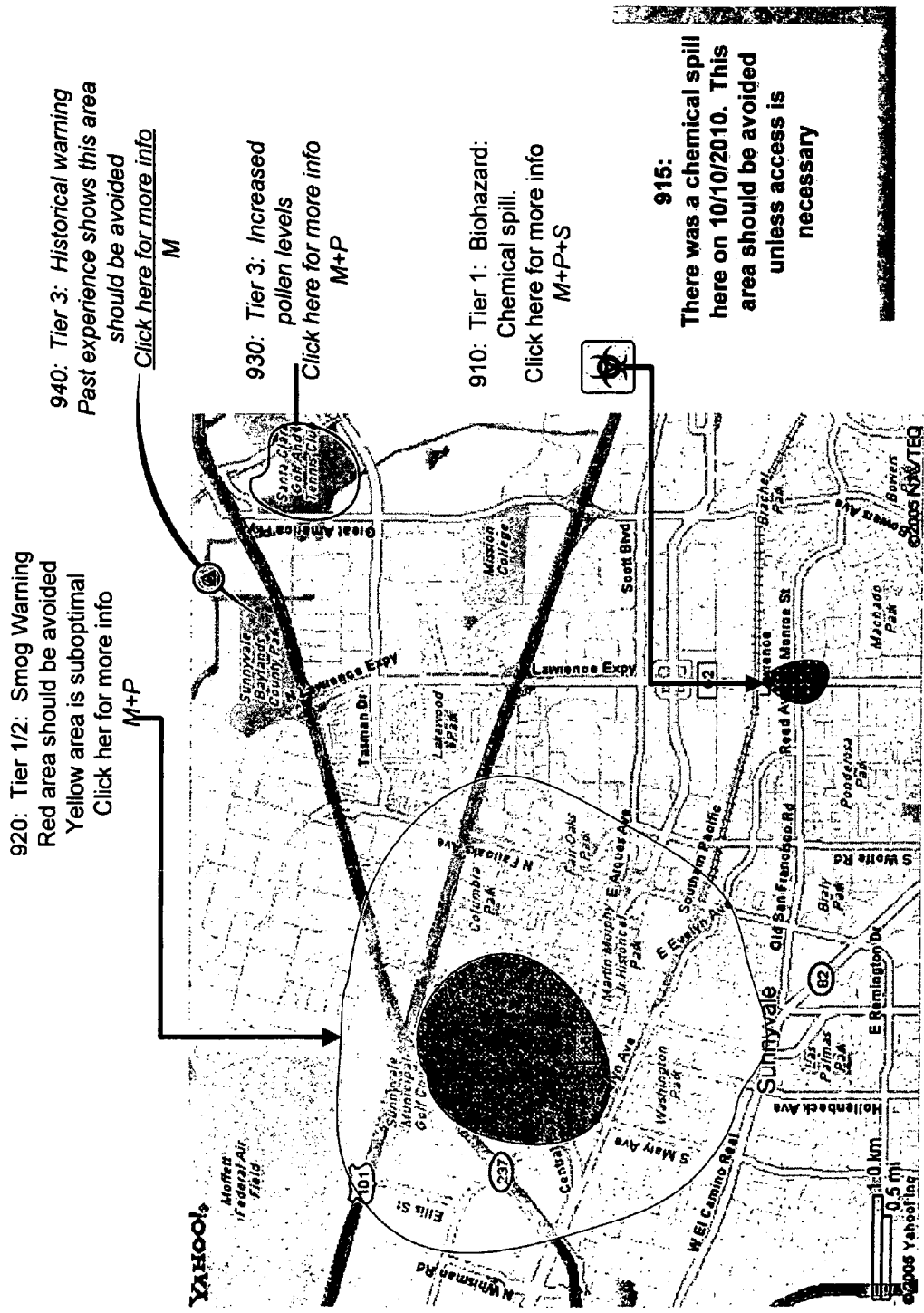
FIG. 9 is an exemplary map display showing the SMD data.

FIG. 9 illustrates an exemplary map which may be displayed. As can be seen, the map includes various markings, which indicate different triggers. Trigger 920 includes two tiers, 1 and 2. The trigger 920 is shown as having a "center" with a high trigger level surrounded by an "outside radius" with a lower concentration of the trigger. Note that a historical warning, shown as trigger 940. In another embodiment, historical warnings are not shown. In yet another embodiment, only high tier historical warnings are shown (for example if an event destroyed the sensors, having a display indicating this would be very useful.)

In one embodiment, a trigger 910, 920, 930, 940 may include a "click here for more information" or similar indicator. Pop-up 915 in this instance provides additional data. In one embodiment, the system automatically pops up the additional information for Tier 1 triggers. Although only three tiers of triggers are shown in FIG. 9, one of skill in the art would understand that the gradation between trigger levels is arbitrary.

In one embodiment, one or more of the triggers may have an associated "affected user" display. For example, in FIG. 9, some of the triggers are for user M alone, some are for users M & P, and some are for users M & P & S. This enables the user to more easily plan routes, especially if the user is planning on picking up or dropping off the specified passengers.

Figure 8B:
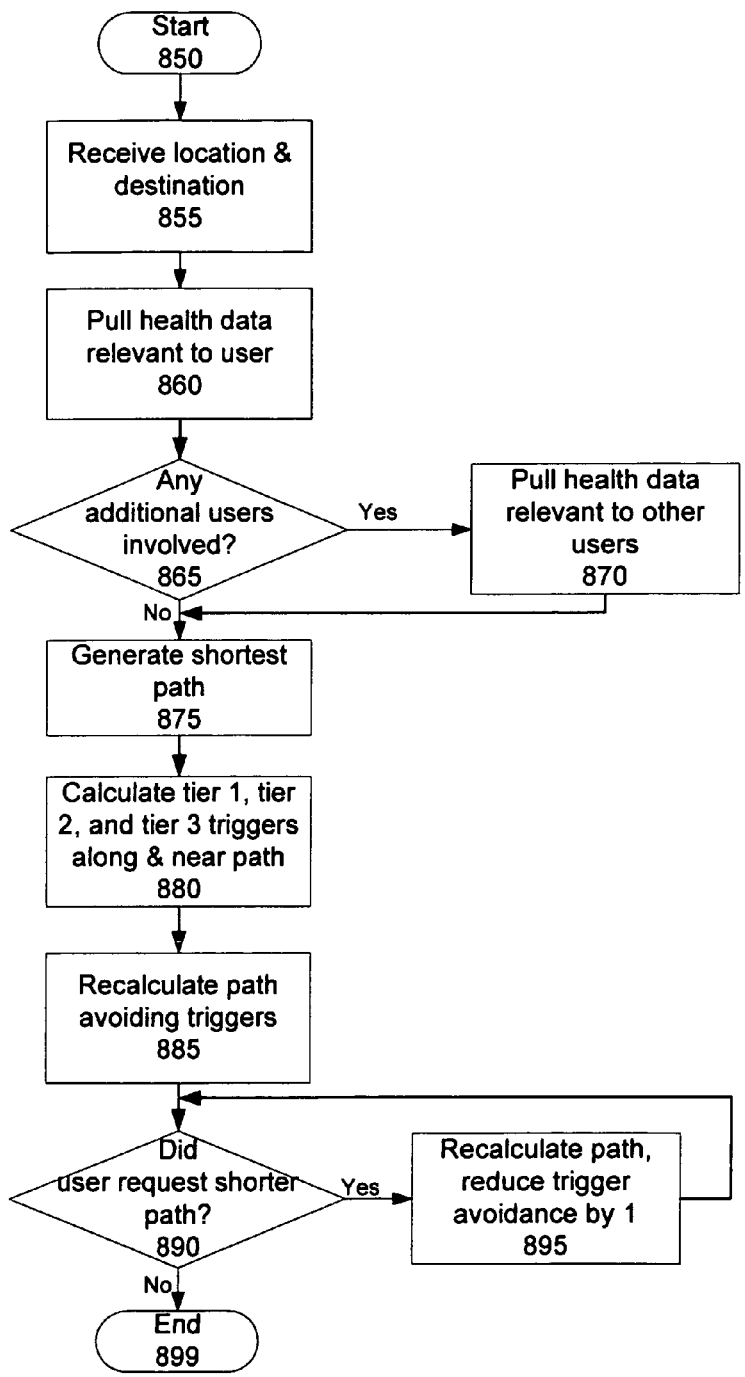
FIG. 8B is a flowchart of one embodiment of path generation based on the SMD data.

FIG. 8B is a flowchart of one embodiment of path generation based on the SMD data. The process starts at block 855.

At block 855 the system receives the user's origin and destination data. In one embodiment, the origin data may be automatically calculated based on location information about the user.

At block 860, 865, 866 the relevant health information about the user and any additional users who are involved, is obtained.

At block 875, the system obtains a shortest path between the origin and the destination. In one embodiment, this may be calculated by the system, or obtained from a third party. In one embodiment, the route may be an optimal route composed of data from multiple sources, such as MapQuest, Google Maps, Yahoo Maps, and others.

At block 880, a subset of triggers is calculated at or near the path. In one embodiment, only a subset of triggers is calculated. This enables the system to leave out very low level triggers. In one embodiment, the user may set as a preference the trigger levels for this calculation.

At block 885, the path is recalculated, avoiding the triggers. In one embodiment, the system recalculates the route internally. In one embodiment, if the external systems permit it, the system indicates that certain paths/roads are severed or not available at the edges of each of the trigger zones. This ensures that the routing is around the "trigger areas."

In one embodiment, if the route must enter a trigger area, the system attempts to minimize the length of time/distance within the trigger zone.

At block 890, the process determines whether the user requested a shorter path. If so, the trigger avoidance is reduced by 1 (i.e. if previously triggers of tiers 1, 2, and 3 were considered "must avoid" triggers, the new calculation adjusts this to consider only triggers of tiers 1 and 2.

Figure 10:
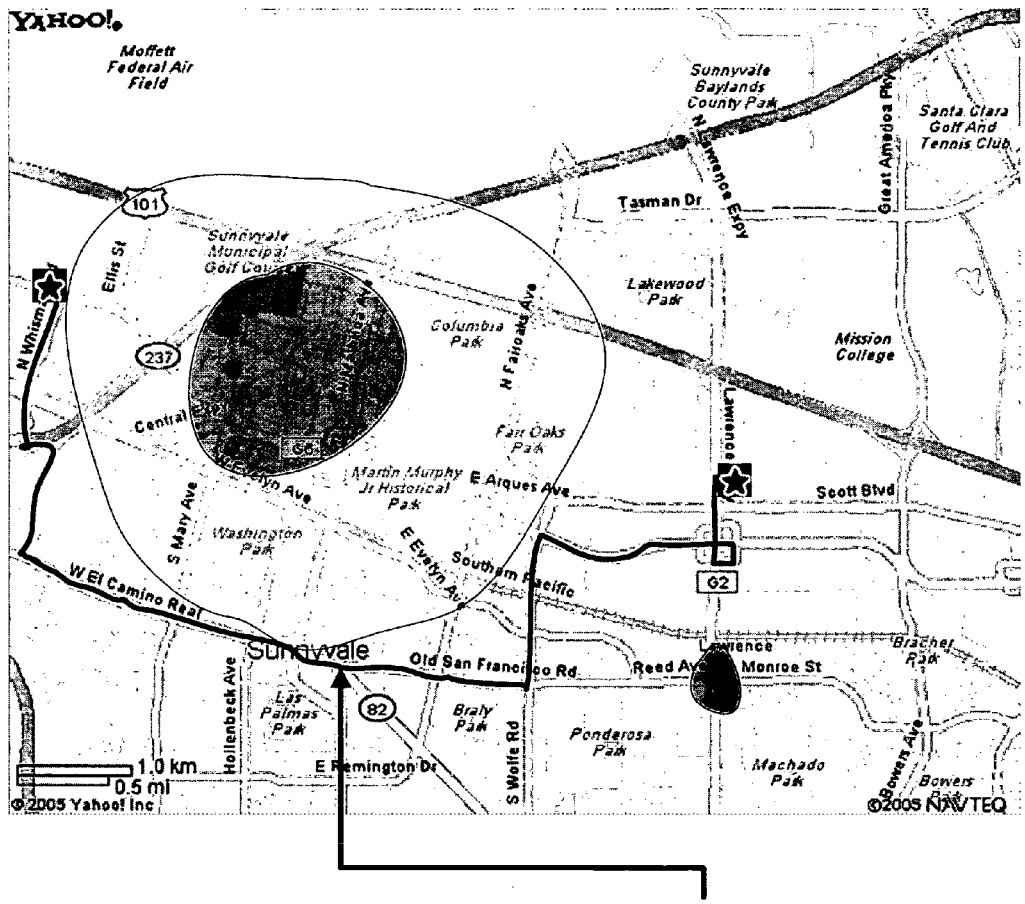
FIG. 10 is an exemplary map display showing a proposed route.

The path is then recalculated, and the process returns to block 890. In one embodiment, the user may control this in both directions. FIG. 10 illustrates a map, including a route 1010. In one embodiment, the user may have a tuner, to modify the routing by increasing trigger sensitivity (which leads to longer paths) or decreasing trigger sensitivity (which leads to shorter paths.)

In the example shown in FIG. 10, a shorter path that may be to drive to 101, but that would require entering the Trigger 920, yellow area. If the user decreased sensitivity, the alternate path would likely involve driving using the highway. Note that these maps and discussions are merely exemplary.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of using location-dependent sensor information comprising:
    maintaining health data pertaining to a plurality of users, the health data including sensitivity information related to the health of the plurality of users;
    receiving pseudo-real-time information from at least two different types of remote sensor/monitor/devices (SMDs);
    determining a location associated with an SMD and integrating the pseudo-real-time information received from the SMD into a location-based database; and
    classifying the information received from the SMD into a plurality of risk types and a plurality of risk tiers;
    receiving a routing request for a vehicle, the routing request including identity information of a plurality of travelers in the vehicle including tier data for each traveler indicating a tier level likely to affect the traveler based on data type; generating a route avoiding locations which have any triggers that would impact any of the plurality of travelers, the triggers indicating local conditions having a risk tier above a certain level, and likely having an effect on one or more of the travelers based on the risk type and the health data of the travelers.

2. The method of claim 1, further comprising:
    identifying deficient sensor data in the pseudo-real-time information; and
    integrating available data to generate a best approximation for the deficient sensor data.

3. The method of claim 2, wherein deficient sensor data comprises one or more sensors that did not provide data.

4. The method of claim 2, wherein deficient sensor data comprises low data density/resolution in available sensor data.

5. The method of claim 2, wherein deficient sensor data comprises lack of a certain type of sensor.

6. The method of claim 2, wherein available data comprises data selected from among the following: older data from a missing sensor, data from similar nearby sensors, data from linked nearby sensors, historical data from the missing sensor.

7. The method of claim 2, further comprising:
    retrieving news information to verify that the available data has not been superseded.

8. The method of claim 2, wherein a calculation is performed when data is not received from a missing sensor.

9. The method of claim 2, wherein a calculation is performed on the fly when data is requested from an area covering a missing sensor.

10. The method of claim 1, further comprising:
    generating the route shown in the travel map for a user upon request.

11. The method of claim 1, wherein at least one trigger indicates a severity and a type.

12. The method of claim 1, further comprising:
    receiving information that the traveler comprises multiple users; and
    generating the route shown in the travel map based on the triggers of the multiple users.

13. The method of claim 1, wherein at least one of the triggers includes a trigger level, indicating a severity of potential response.

14. The method of claim 13, further comprising:
    enabling a user to adjust routing by selecting the trigger level for avoidance.

15. A computing device comprising:
    a sensor data receiving logic to receive pseudo-real-time information from at least two different types of remote sensor/monitor/devices (SMDs) and determine a location associated with the SMDs;
    a processor to classify the sensor data into a tier, denoting severity, and a type of data;
    a database of sensor data including the pseudo-real-time information received from the SMDs, the database providing a location-based database including the tier and the type; and
    a database of health data pertaining to users, the health data including sensitivity information which indicates a tier likely to affect each user based on data type;
    a mapping logic to generate a route avoiding a location which shows any relevant triggers, the relevant triggers comprising a trigger above a certain tier, and of a type relating to the health data of the user, the route shown in a travel map comprising an overlay of the relevant triggers for the user, the overlay indicating a tier, and a type for each trigger on the map.

16. The apparatus of claim 15, further comprising:
    a sensor audit and ping logic to identify deficient sensor data; and
    a projected data calculator to integrate available data to generate a best approximation for the deficient sensor data.

17. The apparatus of claim 16, wherein the deficient sensor data is a result of one or more of the following: one or more sensors that did not provide data; lack of sufficient resolution in available sensor data; or lack of a certain type of sensor.

18. The apparatus claim 16, wherein available data comprises data selected from among the following: older data from a missing sensor, data from similar nearby sensors, data from linked nearby sensors, historical data from the missing sensor.

19. The apparatus of claim 16, further comprising:
a news fetching logic to obtain news information to verify that the available data has not been superseded.

20. The apparatus of claim 16, wherein the projected data calculator generates the best approximation for the deficient sensor data when lacking sensor data is detected.

21. The apparatus of claim 16, wherein the projected data calculator generates the best approximation for the deficient sensor data on the fly when data is requested from an area affected by lacking sensor data.

22. The apparatus of claim 15, further comprising:
the mapping logic to generate the route shown in the travel map for a user upon request.

23. The apparatus of claim 15, wherein at least one trigger indicates a severity and a type.

24. The apparatus of claim 15, further comprising:
the mapping logic receiving information that the traveler comprises multiple users and generating the route shown in the travel map based on the triggers of the multiple users.

25. The apparatus of claim 15, wherein at least one of the triggers includes a trigger level, indicating a severity of potential response.

26. The apparatus of claim 25, further comprising:
a user interface enabling a user to adjust the route by selecting the trigger level for avoidance.

27. A method of using location-dependent sensor information comprising:
maintaining health data pertaining to users of a routing device, the health data including sensitivity information which indicates a tier likely to affect each user based on data type;
receiving pseudo-real-time information from one or more remote sensor/monitor/devices (SMD);
classifying the pseudo-real-time information based on a tier and a type of the information;
determining a location associated with the SMD and integrating the pseudo-real-time information received from the SMD into a location-based database; and
displaying a travel map including a subset of the triggers, selected based on the type information, the tier, and the sensitivity information of the user, the map displaying information about the trigger including the tier and the type information, at least one trigger having a plurality of tiers.

28. The method of claim 27, further comprising:
generating a single travel map based on user sensitivity information of multiple users.

29. The method of claim 27, wherein the triggers include a trigger level, indicating a severity of potential response.

* * * * *